(12) United States Patent
Kirk et al.

(10) Patent No.: US 10,182,618 B2
(45) Date of Patent: *Jan. 22, 2019

(54) MATERIAL FOR SHOE UPPER

(71) Applicant: adidas AG, Herzogenaurach (DE)

(72) Inventors: Robert Frank Kirk, Nuremberg (DE); Brian Hoying, Herzogenaurach (DE); Angus Wardlaw, Nuremberg (DE); Christopher Edward Holmes, Veitsbronn (DE); Carl Arnese, Herzogenaurach (DE); Daniel Paul Cocking, Herzogenaurach (DE); Stanislav Gousev, Herzogenaurach (DE); Marco Fischold, Tangerang (ID); Jack Huang, Fujian (CN)

(73) Assignee: adidas AG, Herzogenaurach (DE)

( * ) Notice: Subject to any disclaimer, the term of this patent is extended or adjusted under 35 U.S.C. 154(b) by 627 days.

This patent is subject to a terminal disclaimer.

(21) Appl. No.: 14/465,086

(22) Filed: Aug. 21, 2014

(65) Prior Publication Data

US 2015/0052778 A1 Feb. 26, 2015

(30) Foreign Application Priority Data

Aug. 23, 2013 (EP) .................... 13181490

(51) Int. Cl.
*A43B 1/00* (2006.01)
*A43B 23/02* (2006.01)
(Continued)

(52) U.S. Cl.
CPC ........ *A43B 23/0235* (2013.01); *A43B 1/0009* (2013.01); *A43B 1/02* (2013.01);
(Continued)

(58) Field of Classification Search
CPC .............. Y10S 36/00; Y10T 442/3187; B32B 5/02–5/12; B32B 25/10; B32B 27/12
(Continued)

(56) References Cited

U.S. PATENT DOCUMENTS 3,397,418 A 8/1968 Gorman et al.
4,263,356 A 4/1981 Nomura et al.
(Continued)

FOREIGN PATENT DOCUMENTS

CN 1145759 3/1997
CN 1342046 3/2002
(Continued)

OTHER PUBLICATIONS

Tortora, P., Understanding Textiles, 5th Edition, 1997, p. 290.*
(Continued)

*Primary Examiner* — Arti Singh-Pandey
(74) *Attorney, Agent, or Firm* — Kilpatrick Townsend & Stockton LLP

(57) ABSTRACT

Described are materials for a shoe upper, in particular for soccer shoes, with a particularly low weight and improved tensile strength. The material includes a first foil layer and a textile reinforcement layer, which is at least partially laminated with the first foil layer. The textile reinforcement layer includes a first textile material with at least three axes, each axis defining an orientation of a set of essentially parallel yarn-portions in the textile material.

13 Claims, 8 Drawing Sheets

(51) Int. Cl.
*A43B 1/02* (2006.01)
*A43B 1/04* (2006.01)
*B32B 5/02* (2006.01)
*B32B 27/06* (2006.01)

(52) U.S. Cl.
CPC .............. *A43B 1/04* (2013.01); *A43B 23/026* (2013.01); *B32B 5/024* (2013.01); *B32B 27/06* (2013.01); *B32B 2250/02* (2013.01); *B32B 2250/03* (2013.01); *B32B 2262/02* (2013.01); *B32B 2437/02* (2013.01); *Y10T 442/3187* (2015.04)

(58) Field of Classification Search
USPC ....... 442/204, 205, 206, 207, 312, 313, 314; D2/969–975
See application file for complete search history.

(56) References Cited

U.S. PATENT DOCUMENTS

| | | | |
|---|---|---|---|
| 4,882,208 | A | 11/1989 | Breitscheidel et al. |
| 4,963,412 | A | 10/1990 | Kokeguchi |
| 6,171,680 | B1 | 1/2001 | Fahmy |
| 6,558,784 | B1 | 5/2003 | Norton et al. |
| 7,178,267 | B2 | 2/2007 | Skaja et al. |
| 7,941,942 | B2 | 5/2011 | Hooper et al. |
| 2002/0148142 | A1 | 10/2002 | Oorei et al. |
| 2003/0093924 | A1 | 5/2003 | Delgorgue et al. |
| 2005/0054252 | A1 | 3/2005 | Baciu et al. |
| 2005/0126038 | A1* | 6/2005 | Skaja ............... A43B 13/181 36/25 R |
| 2005/0208860 | A1* | 9/2005 | Baron ............... A41D 27/28 442/414 |
| 2007/0199210 | A1 | 8/2007 | Vattes et al. |
| 2008/0022554 | A1* | 1/2008 | Meschter ............ A43B 7/14 36/45 |
| 2008/0116043 | A1* | 5/2008 | Chahal ............... B32B 5/28 198/847 |
| 2009/0042471 | A1* | 2/2009 | Cashin ............... B32B 5/18 442/182 |
| 2010/0037483 | A1 | 2/2010 | Meschter et al. |
| 2010/0175276 | A1* | 7/2010 | Dojan ............... A43B 3/26 36/47 |
| 2011/0088282 | A1* | 4/2011 | Dojan ............... A43B 23/0235 36/45 |
| 2012/0100334 | A1* | 4/2012 | Adams ............... B32B 3/266 428/109 |
| 2012/0255201 | A1 | 10/2012 | Little |
| 2013/0055590 | A1* | 3/2013 | Mokos ............... A43B 1/04 36/45 |
| 2013/0232815 | A1* | 9/2013 | Meythaler .......... A43B 23/0225 36/45 |
| 2014/0115923 | A1* | 5/2014 | Meythaler .......... A43B 23/0225 36/47 |
| 2015/0208762 | A1* | 7/2015 | Reinhardt .......... A43B 23/026 36/45 |
| 2018/0035757 | A1 | 2/2018 | Meythaler et al. |
| 2018/0035758 | A1 | 2/2018 | Meythaler et al. |

FOREIGN PATENT DOCUMENTS

| | | |
|---|---|---|
| DE | 3919763 | 12/1989 |
| DE | 102007045739 | 4/2009 |
| DE | 102009028627 | 3/2011 |
| EP | 2649898 | 10/2013 |
| JP | 02116806 | 9/1990 |
| JP | 3059174 | 7/2000 |
| JP | 2002537678 | 11/2002 |
| JP | 2004505654 | 2/2004 |
| JP | 2009202032 | 9/2009 |
| JP | 2010534535 | 11/2010 |
| JP | 2011528935 | 12/2011 |
| WO | 2010110661 | 9/2010 |

OTHER PUBLICATIONS

Dow, Preliminary Investigations of Feasibility of Weaving Triaxial Fabrics (Doweave) Textile Research Journal vol. 40, Issue 11, pp. 986-998 First Published Nov. 1, 1970 https://doi.org/10.1177/004051757004001106 (Year: 1970).*
European Patent Application No. 13155073.3, "Extended European Search Report", dated May 22, 2013, 7 pages.
European Patent Application No. 13181490.7, European Search Report dated Jan. 16, 2014, 7 pages.
FXI, Discoloration of Polyurethane Foam, available online at http://web.archive.org/web/20101124143851/http://fxi.com/assets/pdf/up_06_quality/Discoloration_Info_Sheet_-_111010.pdf, Nov. 2010, 2 pages.
European Patent Application No. 13181490.7, Article 94(3) Communication dated May 3, 2016, 6 pages.
Chinese Application No. 201410407382.X, Office Action dated Oct. 27, 2015, 7 pages.
Niles Fence & Security Products LLC., Explaining Expanded Metal Mesh, available on the internet at http://www.nilesfence.com/files/technical-information-mesh.pdf, at least as early as Feb. 26, 2015, 3 pages.
Japanese Patent Application No. 2014-169114, Office Action dated Apr. 4, 2017, 18 pages (12 pages of English Translation and 6 page of original text).
Chinese Patent Application No. 201410407382.X, Office Action dated Sep. 5, 2017, 10 pages (5 pages of English translation and 5 pages of original document).
Chinese Patent Application No. 201410407382.X, Office Action, dated Jun. 15, 2016, 14 pages (8 pages of English translation and 6 pages of original document).
Chinese Patent Application No. 201410407382.X , Office Action dated Mar. 2, 2017, 8 pages (5 pages of English translation and 3 pages of original document).
European Patent Application No. 13181490.7, Article 94(3) Communication dated Jul. 30, 2018, 16 pages.

* cited by examiner

MATERIAL FOR SHOE UPPER

CROSS REFERENCE TO RELATED APPLICATION

This application is related to and claims priority benefits from European Patent Application No. EP 13181490.7, filed on Aug. 23, 2013, entitled MATERIAL FOR SHOE UPPER ("the '490 application"). The '490 application is hereby incorporated herein in its entirety by this reference.

FIELD OF THE INVENTION

The present invention relates to a material for a shoe upper, in particular for soccer shoes, with a particularly low weight and improved tensile strength.

BACKGROUND

In many sports, athletes cover great distances. In order to reduce the required energy, the weight of sports shoes may be reduced. A reduced weight requires less force during accelerations, for example, and thus reduces the strain on the muscles of an athlete.

An essential factor determining the weight of a shoe is the material of the shoe upper. The weight of the shoe upper may in theory be reduced by simply using less material, for example, by reducing material thicknesses. On the other hand, the shoe upper has to fulfill high quality standards, for example with respect to abrasion resistance, flexibility, lamination, resistance, or stability. In order to fulfill such requirements, multilayer or composite materials may be desirable.

Different shoe uppers with multilayer materials are known in the prior art, such as the combination of a textile material with a plastic layer. For example, DE 10 2009 028 627 A1 describes a shoe upper with textile materials, for example a nylon fabric. The textile material may be additionally enhanced on the outside and/or the inside by an appropriate coating, for example by a transparent layer made from thermoplastic polyurethane ("TPU"), which is glued onto the textile material with hot glue.

US 2010/0037483 A1 describes a material for a shoe upper in which fibers are arranged between a base layer and a cover layer for which a thermoplastic polymer material, for example TPU, may be used. Similar materials for a composite material for a shoe upper are described in U.S. Pat. No. 3,397,418, U.S. Pat. No. 6,558,784 B1, and U.S. Pat. No. 7,941,942 B2. Furthermore, US 2007/0199210 A1 describes a material in which a middle layer is arranged between a first layer and a second layer. The middle layer is a textile fabric, and the first and the second layers are made from a foam material, for example, ethylene-vinyl acetate ("EVA") foam.

US 2011/0088282 A1 describes a composite material for a shoe upper having an outer skin layer and a substrate layer, between which a fabric layer is arranged. The substrate layer may comprise a laminate with a first material layer (for example leather) and a second material layer (for example TPU). The outer skin layer may comprise TPU or a multi-layer material, for example an outer layer from thermoset polyurethane ("PUR") or TPU and an inner layer from TPU.

Another point to be considered, in particular for a shoe upper for a sports shoe, is the stability and response of the upper to different forces. During sporting activities, comparatively large forces may be exerted onto the shoe upper, e.g. during running or when kicking a soccer ball. Furthermore, such forces typically act in a multitude of different directions, depending on the specific movements of the wearer/athlete typically performed during such activities.

In order to provide sufficient stability to the athlete, in particular the foot, and to prevent injuries, the shoe upper has to withstand these forces and protect the foot from external influences. The upper must not tear or lose its shape under the acting stress that is caused by the wearer's movements.

Materials known from the prior art often have certain directions in which their tensile strength is particularly high. Under stress forces acting at an angle to these preferred directions, however, these materials typically deform, shear, or even tear to some degree, which may have a negative effect on the wearing properties of a shoe with an upper made from such a material.

Moreover, in general, the requirements of low weight and stability compete with each other. Trying to minimize the weight of the material typically means losing some stability and tensile strength of the material, at least in some directions, while a high degree of stability and tensile strength typically necessitates the use of thicker or denser materials and therefore leads to an increase in weight.

It is therefore an object of the present invention to provide a material for a shoe upper that at least partly overcomes these disadvantages and combines improved stability with a low weight.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a material for a shoe upper, in particular for soccer shoes, comprises a first foil layer, and a textile reinforcement layer at least partly laminated with the first foil layer, wherein the textile reinforcement layer comprises a first textile material with at least three axes, each axis defining an orientation of a set of essentially parallel yarn-portions in the first textile material.

In certain embodiments, the set of essentially parallel yarn-portions comprise entire yarns. The first textile material of the textile reinforcement layer may be a woven material. In further embodiments, the first textile material comprises multiple sublayers of woven textile material that are interconnected to each other.

The yarn-portions in the first textile material may comprise at least one of a thermoset polyester, thermoset polyurethane, thermoplastic polyester, thermoplastic polyurethane, carbon, polyamide, nylon, basalt, various ultra-high molecular weight polyethylene such as those sold under the trade names of Dacron®, Dyneema®, and Spectra, various aramids such as those sold under the trade name of Technora®, Kevlar®, and Twaron®, polymers with nanotubes or graphene, various liquid crystal polymers such as those sold under the trade names of Vectran®, polyparaphenylenebenzobisethiazole ("PBO") such as that sold under the trade name of Zylon®, polyvinylidene chloride such as that sold under the trade name of Saran, polyethylene naphtalathe, and electrical conductive material.

In some embodiments, the entire yarns that comprise one set of essentially parallel yarn-portions having an orientation defined by one axis of the first textile material differ in at least one characteristic from the entire yarns that comprise at least one other set of essentially parallel yarn-portions having an orientation defined by at least one other axis of the first textile material. The at least one characteristic may be color, thickness, base material, or tear strength.

In some embodiments, the material has a three-dimensional shape. For example, the textile reinforcement layer may be pre-shaped.

According to some embodiments, a shoe upper comprises the material described above. In further embodiments, a shoe may comprise the shoe upper.

According to certain embodiments of the present invention, a material for a shoe upper, in particular for soccer shoes, comprises a first foil layer, and a textile reinforcement layer at least partly laminated with the first foil layer, wherein the textile reinforcement layer comprises a first region comprising a first textile material with at least three axes, each axis defining an orientation of a set of essentially parallel yarn-portions in the first textile material, and a second region comprising a second textile material. The second textile material may be a material with at least three axes, each axis defining an orientation of a set of essentially parallel yarn-portions in the second textile material.

In some embodiments, the yarn-portions in the first textile material comprise a thermoplastic material, and the yarn-portions in the second textile material comprise a non-thermoplastic material. The first textile material and the second textile material may comprise different weave patterns. In further embodiments, the first textile material and the second textile material are provided as one integral piece. The first textile material and the second textile material may also be provided as separate pieces that overlap and/or interlock within the textile reinforcement layer.

According to certain embodiments of the present invention, a material for a shoe upper, in particular for soccer shoes, comprises a first foil layer, a textile reinforcement layer at least partly laminated with the first foil layer, and a second foil layer at least partially laminated with at least one of the textile reinforcement layer and the first foil layer, wherein the textile reinforcement layer comprises a first textile material with at least three axes, each axis defining an orientation of a set of essentially parallel yarn-portions in the first textile material.

In certain embodiments, the second foil layer is arranged at a side of the textile reinforcement layer opposite to the first foil layer. At least one of the first foil layer and the second foil layer may comprise multiple sublayers.

In some embodiments, at least one of the first foil layer, the second foil layer, the multiple sublayers of the first foil layer, and the multiple sublayers of the second foil layer comprise at least one of a thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polylactide, and polyamide.

The textile reinforcement layer may further comprise apertures, wherein the first foil layer and the second foil layer are connected to each other through the apertures of the textile reinforcement layer.

BRIEF DESCRIPTION OF THE DRAWINGS

In the following detailed description, various embodiments of the present invention are described with reference to the following figures.

BRIEF DESCRIPTION

Figure 1:
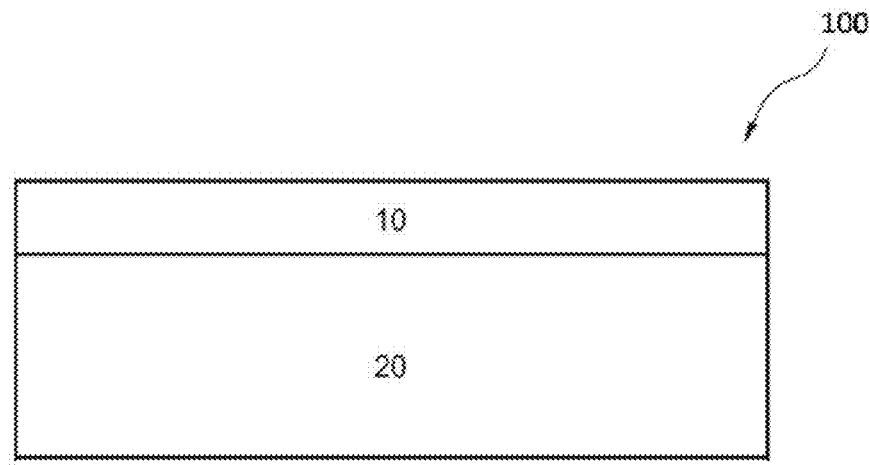
FIG. 1 is a schematic cross-sectional view of a material for a shoe upper comprising a first foil layer and a textile reinforcement layer, according to certain embodiments of the present invention.

According to certain embodiments of the present invention, a material for a shoe upper, in particular for soccer shoes, comprises a first foil layer and a textile reinforcement layer that is at least partly laminated with the first foil layer. The textile reinforcement layer comprises a first textile material with at least three axes, each axis defining an orientation of a set of essentially parallel yarn-portions in the textile material.

The term "essentially parallel" is used herein to mean parallel up to deviations caused by the manufacturing process and the natural irregularities in the yarn-portions.

The yarn-portions may essentially comprise entire yarns.

In this context, "essentially comprise" means that the yarn-portions comprise the entire yarns apart from potential end-portions of the yarns where these may be affixed to, e.g. sewed, glued or wrapped around, or integrated with other components of the material or the upper, or the like.

The use of a first foil layer laminated at least partially with a textile reinforcement layer provides a material for an upper of a shoe having a particularly low weight and at the same time a high amount of stability and tensile strength. The foil may protect the textile reinforcement layer from harmful influences, e.g. dirt, heat, water, chemicals, UV radiation or abrasion, in particular if arranged on the outside of an upper comprising the material. On the other hand, the foil layer may also be arranged on the inside of an upper comprising the material and may therefore, for example, reduce abrasion from a sock against the inside of the upper.

Furthermore, because the first textile material of the textile reinforcement layer has at least three axes, defining the orientation of sets of yarn-portions or yarns that run essentially parallel throughout the first textile material, the stability and tensile strength of the upper material is to a large degree uniform in all directions. In general, the larger the number of axes, i.e. the larger the number of sets of essentially parallel-running yarn-portions or yarns, the more uniform and direction-independent the stability and tensile strength of the material will be. However, an increased number of axes may increase the manufacturing expense of the material and possibly also the weight of the material. Therefore, by an appropriate choice of the number of axes, a compromise between uniform and direction-independent stability and tensile strength on the one hand, and manufacturing expenses and weight on the other hand may be achieved.

The characteristics of the material may be further influenced by the means and features discussed in the following. However, already at this stage, it is explicitly noted that all further features pertaining to the inventive material discussed below are optional rather than mandatory and these features may be combined as deemed fit by a person skilled in the art to obtain certain desired characteristics of the material for a shoe upper, or an upper or shoe comprising such material. Should certain features discussed below be expendable to achieve such a desired goal, they may be omitted without departing from the scope of the invention.

The first textile material of the textile reinforcement layer may be a woven material. A material with three or more axes, in particular a material in which each of these axes defines an orientation of a set of essentially parallel yarns in the textile material, may be conveniently manufactured by a weaving process. This is particularly the case if the first textile material is entirely comprised of the yarns that make up the sets of essentially parallel-running yarns.

The first textile material may furthermore comprise multiple textile sublayers of woven textile material that are interconnected with each other. This may for example reduce the manufacturing expenses, since the sublayers may each comprise a smaller number of axes than the complete material and therefore be easier to weave. The sublayers may then be interconnected to form the finished material with three or more axes.

In certain embodiments, the yarns in the first textile material comprise at least one of the following materials: thermoset polyester, thermoset polyurethane, thermoplastic polyester, thermoplastic polyurethane, carbon, polyamide, nylon, basalt, various ultra-high molecular weight polyethylene such as those sold under the trade name of Dacron®, Dyneema®, and Spectra, various aramids such as those sold under the trade name of Technora®, Kevlar®, and Twaron®, polymers with nanotubes or graphene, various liquid crystal polymers such as those sold under the trade names of Vectran®, polyparaphenylene-benzobisethiazole ("PBO") such as that sold under the trade name of Zylon®, polyvinylidene chloride such as that sold under the trade name of Saran, polyethylene naphtalathe, and electrical conductive material. Moreover, the yarns may be monofilaments or they may be comprised of multiple fibers comprising at least one of the above mentioned materials, respectively.

Each of these materials has its own specific characteristics, as e.g. stiffness, tensile strength, density/weight and so forth, and may therefore be chosen by the skilled artisan for use with the inventive material as deemed fit to achieve the desired properties of the material.

In certain embodiments, the yarns in at least one set of essentially parallel yarns in the first textile material differ in at least one characteristics from the yarns in at least one of the remaining sets of essentially parallel yarns in the first textile material. Herein, at least one characteristic may be color, thickness, or base material.

This allows, for example, creating optical effects or influencing the haptic characteristics of the first textile material and the textile reinforcement layer, and consequently the upper material. It furthermore allows improving the strength of the material in at least one direction even further, e.g. by using thicker yarns in selected directions, or making the material more flexible in certain directions by using more elastic yarns in selected directions.

The textile reinforcement layer may also comprise a first region and a second region, wherein the first region comprises the first textile material and the second region comprises a second textile material. The second textile material may also be a material with at least three axes, each axis defining an orientation of a set of essentially parallel yarn-portions in the second textile material.

In these embodiments as well, the yarn-portions essentially comprise entire yarns.

The second textile material may also be a woven material.

The use of a textile reinforcement layer comprising a first and a second region, or in general a multitude of regions, each comprising a textile material, allows the use of different textile materials in different regions. The regions may thus be tailor-made for the forces typically acting on the respective regions of the upper or other requirements. Alternatively, the same textile material may be used in two or more different regions. To achieve the desired stability, the second textile material may also be a material with at least three axes, which may be a woven material with at least three axes and with each axis defining an orientation of a set of essentially parallel yarns in the second textile material, such that the second textile material may share the same features as discussed herein with regard to the first textile material.

At this point it is mentioned that all features pertaining to the first textile material discussed herein may apply equally well to the second textile material.

In some embodiments, the yarns in the first textile material comprise a thermoplastic material and the yarns in the second textile material comprise a non-thermoplastic material.

Yarns of thermoplastic material are generally stiffer than yarns of non-thermoplastic material, e.g. thermoset material. Thus, the first region comprising the first textile material with the yarns comprising thermoplastic material may predominantly be arranged in the toe and/or heel region and/or midfoot region of the foot in the finished upper, where a higher degree of stability is desirable, whereas the second region comprising the second textile material with yarns comprising non-thermoplastic material, e.g. thermoset material, may predominantly be arranged in flex zones where a certain yielding of the material under stress/strain is desirable, e.g. on the medial and/or lateral side of the metatarsophalangeal articulations.

Furthermore, the first textile material and the second textile material may comprise different weave patterns. The weave pattern may further influence the mechanical, optical, haptic, structural, etc. characteristics, which may translate, at least to a certain degree, into the corresponding characteristics of the upper material, e.g. the smoothness of the surface of the upper material.

The first textile material and the second textile material may be provided as one integral piece. This may increase the overall stability and tear-resistance of the reinforcement layer and may also reduce manufacturing expenses.

In some embodiments, the first textile material and the second textile material are provided as separate pieces that overlap and/or interlock within the textile reinforcement layer. This option may be chosen, e.g., if the different textile materials cannot be woven as one piece or only under increased manufacturing expenses, like a modification of the loom.

In certain embodiments, the material further comprises a second foil layer that is at least partially laminated with the textile reinforcement layer and/or the first foil layer. The second foil layer may be arranged at a side of the textile reinforcement layer opposite to the first foil layer.

The second foil layer may further increase the overall strength of the upper material and further influence the optical, mechanical, haptic, etc. properties of the material. In particular when arranged on the side of the textile reinforcement layer opposite to the first foil layer, such that the textile reinforcement layer is, at least partially, "sandwiched" between the two foil layers, the two foil layers may effectively protect the textile reinforcement layer from harmful influence from the outside, like water, dirt, UV radiation, abrasion, chemicals and so forth. Hence, the strength and the durability of the textile reinforcement layer and therefore of the upper material, the upper, and the complete shoe are increased. The first foil layer may, e.g. be intended to be arranged on the outside of the upper and the second foil layer on the inside of the upper, or vice versa. A foil layer arranged on the inside of the finished upper may also protect the wearer's foot from chafing by the textile reinforcement layer.

The first foil layer and/or the second foil layer may furthermore comprise multiple sublayers. The use of multiple sublayers further increases the possibilities to influence the mechanical, optical, chemical, haptic, etc. properties of the upper material by choosing suitable materials for the different sublayers instead of just a single first and/or second foil layer. Also, a manufacturing process involving, for example, multiple thinner sublayers instead of just one thick foil layer may have lower manufacturing expenses and/or may provide more reliable results.

The first foil layer and/or the second foil layer and/or any sublayer of the first and/or second foil layer may comprise at least one of the following materials: thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polyactide, polyamide.

These materials provide a mixture of material characteristics that may be beneficial for use with shoe uppers. Depending on, e.g., the specific ratio and mixture of two or more of the above materials, the foil material may be tailored to the specific needs of a given upper/shoe.

In some embodiments, the textile reinforcement layer comprises apertures and the first foil layer and the second foil layer are connected to each other through the apertures of the textile reinforcement layer. In certain embodiments, this type of connection produces a particularly durable bond of the first and second foil layer and therefore of the whole upper laminate, i.e. the upper material comprising the first and second foil layer and the textile reinforcement layer in at least partially laminated form. The connection of the two foils also effectively secures the textile reinforcement layer within the upper material. Such a bond may be achieved if the two foil layers comprise materials of the same material class that may, e.g., be bonded together without additional adhesives, e.g. under the influence of heat and/or pressure. On the other hand, the two foil layers may be bonded using adhesives like glue or hot glue, if appropriate.

The inventive material for a shoe upper may also have a three-dimensional shape. The three-dimensional shape may be obtained by at least partially heating the yarns of the first and/or second textile material.

In certain embodiments, the textile reinforcement layer may be pre-shaped into the desired three-dimensional shape prior to incorporation into the upper. It is thus, for example, possible to provide a "hardened", pre-shaped textile reinforcement layer intended for regions of the upper that are subject to particularly strong forces or arranged in parts of the wearer's foot that are particularly prone to injuries. In some embodiments, a pre-shaped "foot cap" in the toe and/or instep area, e.g. for soccer shoes, or a "heel cap" may be formed in this manner. In further embodiments, the pre-shaped textile reinforcement layer may form a stabilizing element in the midfoot region.

A person of ordinary skill in the relevant art will understand that the yarns of the respective textile material may have characteristics that allow the textile reinforcement layer to be pre-shaped into the desired three-dimensional shape. In certain embodiments, the textile reinforcement layer may be pre-shaped through a variety of techniques, including but not limited to heat treatment, press-fitting, molding, etc. For example, the yarns of the respective textile material may be heated, at least partially, and then formed around a shoe last, or the like. They may then also be cooled again, to achieve a lasting three-dimensional shape.

Further embodiments of the invention are provided by an upper for a shoe comprising an inventive material for a shoe upper as discussed herein, and a shoe, in particular a soccer shoe, comprising such an upper.

It is again mentioned here that in providing an upper, or a shoe with such an upper, comprising embodiments of the inventive material, the different features pertaining to the inventive material discussed herein are optional rather than mandatory and these features may be combined as deemed fit by a person skilled in the art to obtain a certain desired result. Should certain of the features discussed herein be expendable to achieve such a desired result, they may also be omitted without departing from the scope of the invention.

Furthermore, the following points shall be explicitly mentioned here: First, whereas mainly soccer shoes will be mentioned and described in the following, it is clear that embodiments of the inventive material may also be used for other types of shoes like running shoes, basketball shoes, walking shoes, street wear and so forth. Second, embodiments of the inventive material could also be used just for parts of an upper. For example, embodiments of the material could be used in the heel and midfoot area and a conventional mesh upper material could be used in the forefoot area. This could e.g. provide breathability of the shoe. Third, embodiments of the inventive material could also be used for shoe elements only, for example a cage element in the midfoot area for stabilization, and so forth. Fourth, several layers of material could be layered on top of each other in certain areas for adding stability, for example in the toe and heel area. And fifth, the first and/or second foil layer could be applied only in zones, so the textile reinforcement layer could be "free" in certain areas, e.g. for ventilation or reducing weight.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, examples of embodiments and modifications of the present invention are described with respect to a material for a shoe upper. This material may be used for sports shoes and in particular for soccer shoes. However, it may also be used for other shoes, e.g. for basketball shoes, which require both a low weight and good mechanical properties, as described in the following.

FIG. 1 illustrates embodiments of the material 100. FIG. 1 shows a schematic cross-sectional view of such a material 100. This illustration does not represent proportions, which will be discussed in more detail below. The material 100 comprises a first foil layer 10 and a textile reinforcement layer 20 at least partly laminated with the first foil layer 10.

The textile reinforcement layer 20 comprises a first textile material with at least three axes, each axis defining an orientation of a set of essentially parallel yarn-portions in the first textile material.

In some embodiments, the yarn-portions essentially comprise entire yarns, e.g. of a woven material (cf., for example, the embodiment 20 discussed in relation with FIG. 3 below). It is, however, also possible that the yarn-portions comprise parts of stitches of a knitted material or the like.

As just mentioned, the first textile material of the textile reinforcement layer 20 may, for example, be a woven material. A weaving process is particularly well suited to produce a first textile material with three or more axes, in particular a woven material in which the essentially parallel yarn-portions essentially comprise entire yarns.

The first textile material may, however, also comprise, or consist of, a knitted material, for example a weft/warp knit, a spacer knit, an engineered knit, a circular knit and/or a flat knit. The knitted textile material may furthermore include structures like rips and/or it may comprise different knitted sublayers. The first textile material may also comprise a braided material or a non-woven material like a felt or a fleece. In these cases, the presence of essentially parallel yarn-portions, instead of essentially parallel entire yarns as may be the case with, e.g., a woven material, may nevertheless lead to an appearance which is not dissimilar to such a woven material, at least if considered at scales larger than, say, 5 mm or 1 cm. In essence, the resulting structure of such a material, e.g. a knitted multiaxial material, may have multiple dominant axes along which the majority of the knitted material is placed, which may lead to a similar appearance and similar characteristics as a woven material with sets of essentially parallel entire yarns.

As already explained above, because the first textile material has three or more axes, each defining the orientation of sets of yarn-portions or yarns that run essentially parallel throughout the first textile material, the stability and tensile strength of the upper material 100 is to a large degree uniform in all directions. In general, the larger the number of axes, i.e. the larger the number of sets of essentially parallel-running yarn-portions or yarns, the more uniform and direction-independent the stability and tensile strength of the first textile material and therefore of the upper material 100 will be. On the other hand, an increased number of axes may increase the manufacturing expense of the first textile material and possibly also the weight of the first textile material and thus the upper material 100. Therefore, by an appropriate choice of the number of axes, a compromise between uniform and direction-independent stability and tensile strength on the one hand, and manufacturing expenses and weight on the other hand may be achieved.

In certain embodiments, the first textile material has three axes, i.e. triaxial materials. This achieves a good compromise between uniform and direction-independent stability and tensile strength on the one hand, and manufacturing expense and weight on the other hand.

The first textile material may consist solely of the yarns comprising the sets of essentially parallel yarn-portions or yarns. Alternatively, the first textile material may comprise additional components and/or materials. Furthermore, the yarns may be monofilaments or they may be comprised of multiple fibers. A combination of both types of yarns within the first textile material is also possible. The yarns in the first textile material may comprise at least one of the following materials: thermoset polyester, thermoset polyurethane, thermoplastic polyester, thermoplastic polyurethane, carbon, polyamide, nylon, basalt, various ultra-high molecular weight polyethylene such as those sold under the trade name of Dacron®, Dyneema®, and Spectra, various aramids such as those sold under the trade name of Technora®, Kevlar®, and Twaron®, polymers with nanotubes or graphene, various liquid crystal polymers such as those sold under the trade names of Vectran®, polyparaphenylene-benzobisethiazole ("PBO") such as that sold under the trade name of Zylon®, polyvinylidene chloride such as that sold under the trade name of Saran, polyethylene naphtalathe and/or electrical conductive material.

It is furthermore possible that the yarns in at least one set of essentially parallel yarns differ from the yarns in at least one of the remaining sets of essentially parallel yarns in at least one characteristic. Such characteristics may, for example, be the color, thickness and/or base material of the yarns in the respective sets.

In theory, the use of yarns that differ in these categories is, of course, also possible within a first textile material wherein the essentially parallel yarn-portions do not essentially comprise entire yarns.

For yarns in the first textile material that are not monofilaments, some of the yarns themselves may comprise a number of different fibers that differ, for example, in their color, thickness and/or base material.

In this way, the optical and/or haptic properties of the first textile material and the textile reinforcement layer 20 may be influenced. Furthermore, the tensile strength/flexibility of the first textile material and the textile reinforcement layer 20 may be influenced and adjusted as desired in certain selected directions by an appropriate choice of the respective yarns, in particular if the yarn-portions essentially comprise entire yarns.

It is furthermore possible that the first textile material comprises multiple sublayers of woven textile material that are interconnected with each other to, at least partially, form the first textile material with the three or more axes.

For example, the sublayers may comprise different materials and/or different yarns and they may have different thicknesses or differ in other properties. One possibility is that the sublayers are interwoven so that the resulting woven material comprises the different materials and/or yarns. The interconnection may, for example, simply be the same as that of a woven material consisting of a single material. However, the interaction at the contact points between the yarns of the sublayers could also be further strengthened by applying a resin or bonding agent to the resulting multiaxial textile material which would better fix the alignment of the resulting material.

In certain embodiments, each of the textile sublayers may comprise the same woven textile material with the same number of axes, in the sense defined above. Herein, the sublayers may each comprise a textile material that has less than three axes, whereas the first textile material comprising the different interconnected sublayers has three or more axes. In this way, the manufacture of the first textile material may be facilitated. Alternatively, at least one of the textile sublayers may also comprise a textile material that already has three or more axes.

The considerations put forth herein pertaining to the first textile material may also apply to the individual sublayers.

The textile reinforcement layer 20 may be solely comprised of the first textile material or it may comprise additional components and/or materials.

The textile reinforcement layer 20 may, for example, comprise multiple regions, wherein one region comprises the first textile material with three or more axes, and wherein at least one of the remaining regions is free from the first textile material. Alternatively, the at least one remaining region may also comprise the first textile material and at least one additional material. The textile reinforcement layer 20 may, for example, comprise a first region and a second region, wherein the first region comprises the first textile material and the second region comprises a second textile material. The second textile material may also be a material with at least three axes, each axis defining an orientation of a set of essentially parallel yarn-portions, such as yarns, in the second textile material. The second textile material may also be a woven material. The second textile material may comprise yarns that are different from the yarns in the first textile material. Alternatively, the second textile material may, at least partially, comprise yarns that are also present in the first textile material. This allows selectively tuning the material properties of the textile reinforcement layer 20 in individual regions to match the requirements and desired characteristics in the respective regions of the upper.

The term region as used in this application refers to any part or area of the textile reinforcement layer 20. A region may therefore be formed as a sublayer of the textile reinforcement layer 20. A region may also be a connected part of the textile reinforcement layer 20 that is bounded by at least one boundary extending throughout the entire thickness of the textile reinforcement layer 20, i.e. from a side facing the first foil layer 10 to an opposite side. A region may furthermore comprise several individual parts and/or layers that are not connected to each other. Combinations of the above described possibilities are also possible.

In certain embodiments, the yarns in the first textile material comprise a thermoplastic material and the yarns in the second textile material comprise a non-thermoplastic material, e.g. a thermoset material. A yarn comprising a thermoplastic material is in general stiffer than a yarn comprising non-thermoplastic material. Hence, the first region with the first textile material may be arranged in the upper in places where increased stability is required, e.g. in the instep/toe region, the heel region and/or the midfoot region, whereas the second region with the second textile material may be arranged in places where some flexibility is desirable, e.g. on the medial/lateral side adjacent to the metatarsophalangeal articulations.

Moreover, the first textile material and the second textile material may comprise different weave patterns, knitting patterns, etc. In this way, the optical, haptic and elastic properties in the different regions may further be influenced and adjusted. In particular for soccer shoes, it may be desirable to provide the upper with several distinct regions having different frictional surface characteristics with regard to contacting the ball in the respective regions. In other words, in some regions it may be desirable to provide the upper with as smooth a surface structure as possible, whereas in other regions it may be beneficial to have a "rougher" surface structure that provides more friction between the upper and the ball during contact. This may, e.g., be achieved by choosing a flat weave pattern in the first kind of regions, whereas in the second kind of regions a wavelike weave pattern or the like may be chosen. The surface structure may furthermore be influenced by an appropriate choice of the yarns used in the respective regions.

The first textile material and the second textile material may be provided as one integral piece. This improves the overall stability of the textile reinforcement layer and may facilitate manufacture, since less individual parts may have to be handled.

Alternatively, the first textile material and the second textile material may be provided as separated pieces. The first textile material and the second textile material may then, for example, interlock and/or overlap within the textile reinforcement layer 20. The multiple regions of the textile reinforcement layer 20 may, for example, be arranged like a puzzle, interlocking with each other. Such embodiments may be desirable if the loom used for the manufacture cannot provide integrally formed first and second textile materials without high manufacture efforts, for example. By overlapping or interlocking the individual textile materials within the textile reinforcement layer 20, the necessary stability may still be provided.

It is apparent for a skilled artisan that the above considerations may also be generalized to a textile reinforcement layer 20 comprising more than two regions and/or textile materials.

As already stated above, the textile reinforcement layer 20 is at least partly laminated with the first foil layer 10. In some embodiments, the first foil layer and the textile reinforcement layer 20 are completely laminated. The at least partial lamination also serves to increase the overall strength, stability and durability of the upper material 100. The first foil layer 10 may, in particular, protect the textile reinforcement layer 20 from external influences, like dirt, water, chemicals, abrasion, UV radiation and so forth. To this end, the first foil layer 10 may be arranged on the outside of a shoe upper. The first foil layer 10 may, however, also be arranged on the inside of a shoe upper, e.g. to avoid chafing of the textile reinforcement layer 20 on the foot.

The lamination may be achieved by subjecting the first foil layer 10 and the textile reinforcement layer 20 to a heat and/or pressure process. The first foil layer 10 may, for example, be at least partially melted whereupon the textile reinforcement layer 20 is pressed into the at least partially melted first foil layer 10. After cooling, the lamination is effected. Alternatively or in addition, a glue or hot glue may be disposed between the first foil layer 10 and the textile reinforcement layer 20 to effect or further strengthen the lamination.

The first foil layer 10 may comprise at least one of the following materials: thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polyactide, and/or polyamide. These materials have material properties that may be beneficial for use with materials 100 for a shoe upper. Certain embodiments of the first foil layer 10, including various embodiments of these materials, are discussed in further detail below.

The material 100 may also have a three-dimensional shape. Such a three-dimensional shape may, for example, be obtained by at least partly heating the yarns of the first textile material and/or the second textile material. It is again mentioned here that the embodiments discussed herein may also be generalized to a textile reinforcement layer 20 comprising more than a first and a second region comprising a first and a second textile material, respectively. By providing an upper material 100 with a lasting three-dimensional shape, e.g. the protective function of the shoe upper may be further enhanced.

Figure 2:
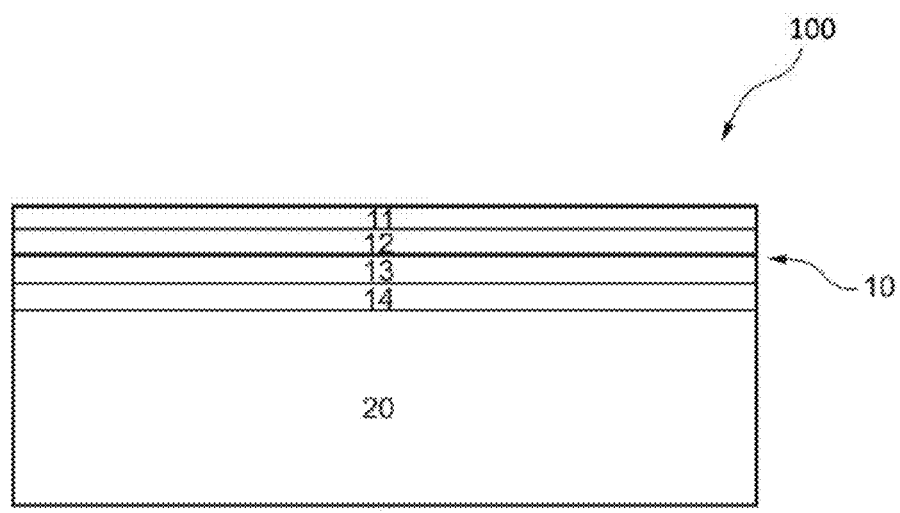
FIG. 2 is a schematic cross-sectional view of a material for a shoe upper, wherein the first foil layer comprises multiple sublayers, according to certain embodiments of the present invention.

FIG. 2 shows a modification of the embodiments of a material for a shoe upper 100 discussed in relation to FIG. 1. Therefore, all considerations put forth above with regard to the material 100 shown in FIG. 1 also apply to the embodiments discussed herein. In the embodiments shown in FIG. 2, the first foil layer of the upper material 100 comprises multiple sublayers. The embodiments shown in FIG. 2 comprises four sublayers 11, 12, 13 and 14. It is, however, clear to a person skilled in the art that also a different number of sublayers is possible. The sublayers 11, 12, 13 and 14 may also comprise at least one of the following materials: thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polyactide, and/or polyamide.

By providing a first foil layer 10 comprising multiple sublayers, e.g. sublayers 11, 12, 13 and 14, the properties of the first foil layer 10 may be further influenced and adjusted to meet the desired material characteristics. Furthermore, the layered design of the first foil layer 10 may facilitate manufacture of the first foil layer, as for example discussed below with reference to FIG. 10.

Figure 3:
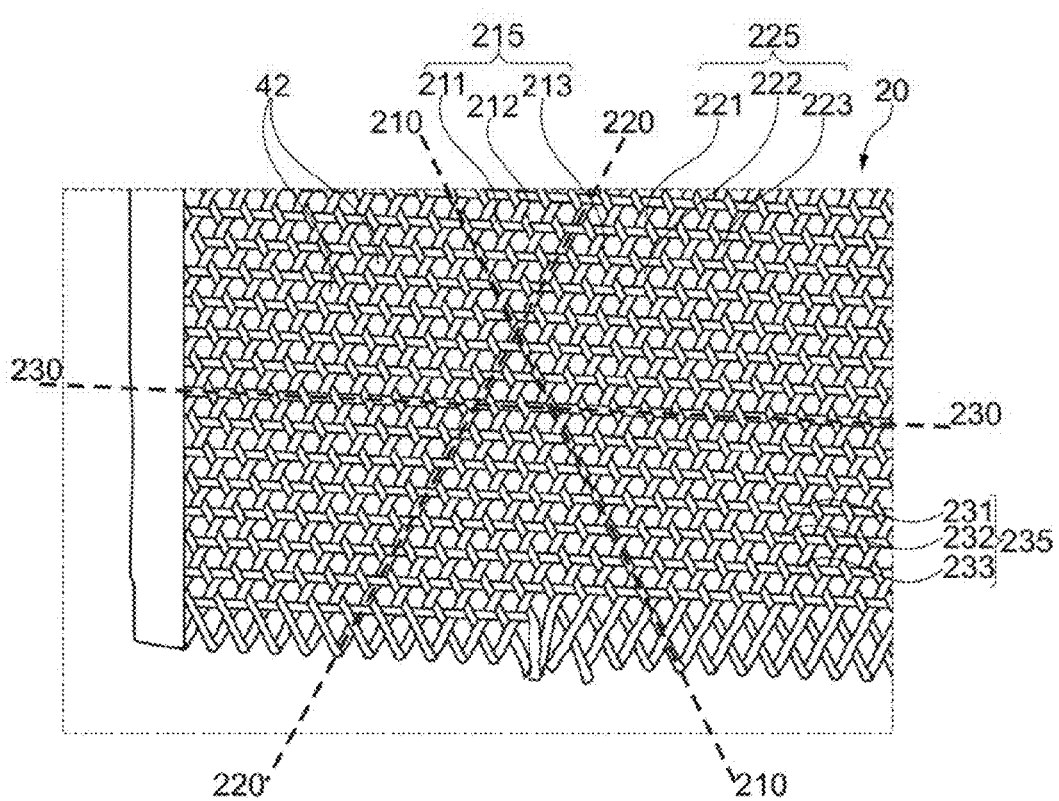
FIG. 3 is top view of a textile reinforcement layer, according to certain embodiments of the present invention.

FIG. 3 shows additional embodiments of a textile reinforcement layer 20 that may be used with a material for a shoe upper, e.g. the materials 100 and 1 (cf. below) discussed herein.

The reinforcement layer 20 is comprised of a woven first textile material with three axes 210, 220 and 230. A material with three axes is also referred to as a triaxial material. Each of the axes 210, 220 and 230 defines an orientation of a set of essentially parallel yarns in the first textile material 20.

Axis 210 defines an orientation of a first set 215 of essentially parallel yarns, of which three representatives 211, 212 and 213 are shown. It is clear to a skilled artisan, however, that the set 215 also comprises further yarns in the first textile material that run essentially parallel to the yarns 211, 212 and 213 and the axis 210, and not only the yarns 211, 212 and 213 explicitly referenced in FIG. 3. The same is true for the sets 225 and 235.

The term "essentially parallel" is used herein to mean parallel up to deviations caused by the manufacturing process and the natural irregularities in the yarns, or yarn-portions. Furthermore, it is to be appreciated that when bent, stretched or subjected to forces in general, the parallelism between the yarns, or yarn-portions, of a given set might be lost. When referring to sets of parallel yarns, or yarn-portions, such references are intended to relate to the textile material in a state with no forces acting on it.

Axis 220 defines an orientation of a second set 225 of essentially parallel yarns in the first textile material, of which three representatives 221, 222 and 223 are shown.

Axis 230 defines an orientation of a third set 235 of essentially parallel yarns in the first textile material, of which three representatives 231, 232 and 233 are shown.

The yarns in the first textile material comprising the textile reinforcement layer 20 shown in FIG. 3 are comprised of fibers comprising thermoplastic polyester. However, monofilaments and other base materials may also be used, as discussed above. Furthermore, the first textile material may be woven in such a pattern that apertures 42 are created between the individual yarns in the first textile material. Therefore, in the present case, the textile reinforcement layer 20 comprises apertures 42.

In some embodiments, the three axes 210, 220 and 230, as well as the distance between two adjacent yarns in a given set of essentially parallel yarns, e.g. the distance between yarns 211 and 212, between yarns 221 and 222, and between yarns 231 and 232, are chosen such that the apertures 42 have an essentially hexagonal shape. The term "essentially hexagonal" is to be understood as hexagonal up to deviations caused by the manufacturing process and the natural irregularities in the yarns. The diameter of the apertures may be smaller than 2.5 mm. It may, for example, lie in the range of 1.5-2.5 mm. The diameter may be determined by, e.g., taking a number of measurements and taking the mean value of these measurements. In each measurement, the distance between two points on opposite edges of a given aperture 42 are measured, the points being defined by a line running through the center point of the respective aperture 42.

In other embodiments (not shown), the distance between two adjacent yarns may, however, also be different among some or all of the sets of essentially parallel yarns. It is also possible that the distance between two adjacent yarns changes within a given set of essentially parallel yarns. Moreover, orientations of the axes different to the ones shown in FIG. 3 may be chosen, which might result in different shapes of the apertures 42. As a result, the textile material and its directional tensile strength, flexibility and so forth may be individually tuned as desired.

Figure 4:
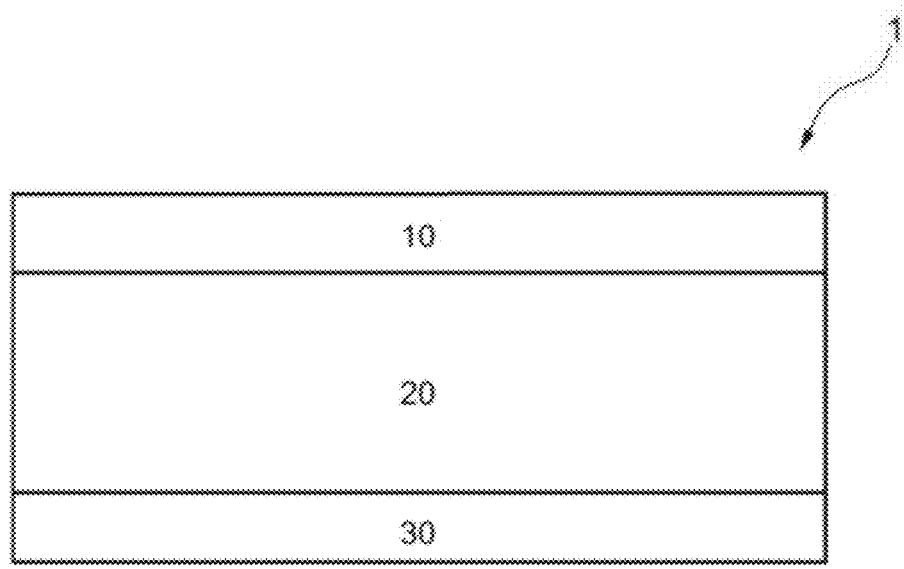
FIG. 4 is a schematic cross-sectional view of a material comprising a first foil layer, a textile reinforcement layer, and a second foil layer, according to certain embodiments of the present invention.

FIG. 4 shows embodiments of a material for a shoe upper 1, comprising a first foil layer 10 and a textile reinforcement layer 20 at least partially laminated with the first foil layer 10. The textile reinforcement layer 20 comprises a first textile material with at least three axes, each axis defining an orientation of a set of essentially parallel yarn-portions or yarns in the first textile material. All considerations pertaining to the first foil layer 10 and the textile reinforcement layer 20 put forth so far, in particular all considerations regarding the material 100, may be applied equally as well to the embodiments discussed in the following, in particular to the material 1.

Figure 5:
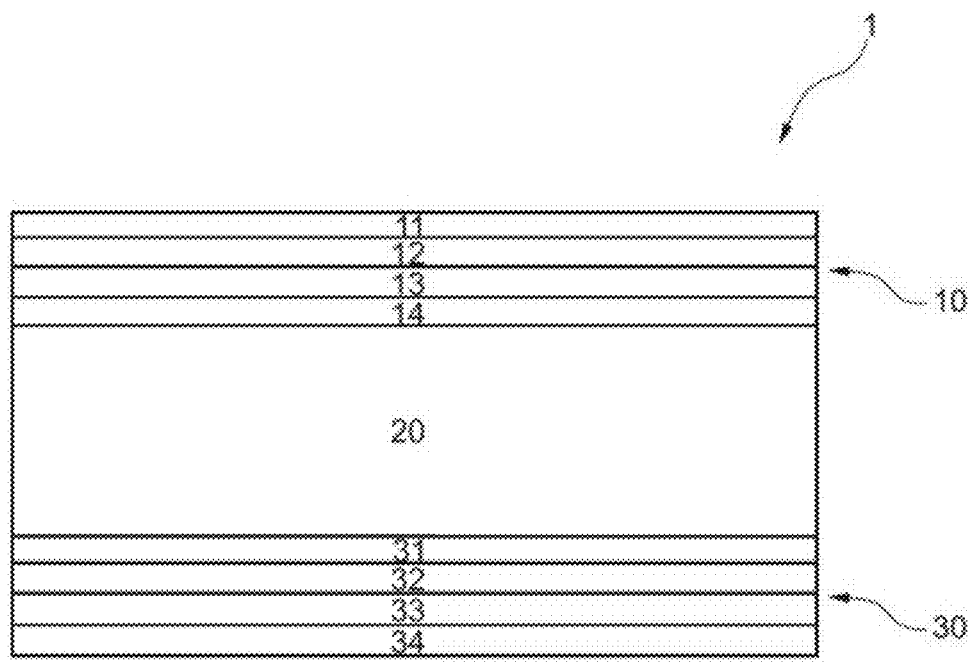
FIG. 5 is a schematic cross-sectional view of a material, wherein the first foil layer and the second foil layer each comprise multiple sublayers, according to certain embodiments of the present invention.

In addition to the features discussed so far, the material 1 shown in FIG. 4 comprises a second foil layer 30. In some embodiments, the second foil layer 30 is arranged at a side of the textile reinforcement layer 20 opposite to the first foil layer 10. The second foil layer 30 may be at least partially laminated with the first foil layer 10 and/or the textile reinforcement layer 20. The second foil layer 30 may comprise the same features and characteristics already discussed above in relation to the first foil layer 10, e.g. the same materials. In particular, the second foil layer 30 may also comprise multiple sublayers, for example four sublayers 31, 32, 33 and 34 as shown in FIG. 5. It is also possible, that only one of the two foil layers, e.g. either the first foil layer 10 or the second foil layer 30 comprises multiple sublayers, while the other foil layer does not comprise multiple sublayers.

In connection with the embodiments of a material 1 as shown in FIGS. 4 and 5, comprising two foil layers 10 and 30 arranged at opposite sides of the textile reinforcement layer 20, it may be desirable for the textile reinforcement layer 20 to comprise apertures, like apertures 42 of the embodiments of a textile reinforcement layer 20 shown in FIG. 3, since the first foil layer 10 and the second foil layer 30 may then be connected to each other through the apertures of the textile reinforcement layer 20. This may yield a particularly durable bond of the first and second foil layers 10, 30 and may also help to secure the textile reinforcement layer 20 in its place in a kind of "sandwich construction."

In this regard, it may be desirable for the first and second foil layers 10, 30 to comprise materials of the same material class to achieve a particularly durable bond.

As already stated above, the first foil layer 10 and/or the second foil layer 30 and or any of the at least one sublayer of the first and/or second foil layers 10, 30 may comprise at least one of the following materials: thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polyactide, and/or polyamide.

In some embodiments, material 1 comprises an inner polyurethane layer 10 (i.e. a first foil layer 10), a textile reinforcement layer 20—e.g. a textile reinforcement layer 20 as discussed in relation to FIG. 3—and an outer polyurethane layer 30 (i.e. a second foil layer 30). The textile reinforcement layer 20 is arranged between the inner polyurethane layer 10 and the outer polyurethane layer 30. The polyurethane layers 10, 30 may be polyurethane films 10, 30. In certain embodiments, the polyurethane layers 10, 30 may also be cast. In the following, polyurethane films 10, 30 are discussed, which will be simply referred to as PUR films 10, 30.

The term inner PUR film 10 refers to the fact that this film is arranged on the inside of a shoe upper for which the material 1 is used. The designation outer PUR 30 film refers to the fact that this film is arranged on the outside of a shoe upper for which the material 1 is used. Alternatively, the PUR film 10 may be arranged on the outside of a shoe upper and the PUR film 30 on the inside of a shoe upper for which the material 1 is used.

The inner PUR film 10, the textile reinforcement layer 20 and the outer PUR film 30 may be grouted under heat and pressure. In some embodiments, the textile reinforcement layer 20 comprises apertures, e.g. the apertures 42 shown in FIG. 3, such that the inner PUR film 10 and the outer PUR film 30 may melt together through the apertures in the textile reinforcement layer 20 such that a reliable connection results. At the same time, the inner PUR film 10 and the outer PUR film 30 may enclose the yarns of the textile reinforcement layer 20 thus creating a connection between the textile reinforcement layer 20 and the PUR films 10, 30. This will be discussed in the following.

The inner PUR film 10 and the outer PUR film 30 may also comprise a mixture of polyester and polyether. In this regard, a higher proportion of polyester may result in better mechanical properties such as increased tensile strength or increased hardness, for example. A higher proportion of polyether may result in better chemical properties, such as UV stability and resistance to hydrolysis due to aliphatic compounds in the polyether.

In certain embodiments, a mixture ratio of polyester to polyether of 65% to 35% may be used, in order to simultaneously ensure high cost efficiency and sufficient quality, particularly UV stability and resistance to hydrolysis.

Apart from polyether and polyester, the PUR films may comprise polyisocyanate. In some embodiments, aliphatic polyisocyanate is used in this regard. As a result, in some embodiments, the PUR films do not yellow (UV stability) and are hydrolysis-resistant.

In some embodiments, the material 1 comprises the inner PUR film 10, the textile reinforcement layer 20 and the outer PUR film 30.

The use of a PUR film on both sides of the textile reinforcement layer 20 may achieve a particularly good bond of the two films 10, 30, e.g. during pressing of the material under heat and pressure. The use of two PUR films may be desirable since the PUR films may have the same or similar melting points and the same or similar material properties, which may achieve a better bond between the PUR films 10, 30 than between a PUR film and other materials.

The polyurethane used for the PUR films 10, 30 may be a thermoset polyurethane comprising an additional curing agent. The thermoset polyurethane comprising an additional curing agent may comprise the material 1 of one layer of the shoe upper. To create the shoe upper, this material is heated during manufacture.

The textile reinforcement layer 20 may comprise apertures that enable the inner PUR film 10 and the outer PUR film 30 to melt together through the apertures, i.e. the apertures extend through the entire thickness of the textile reinforcement layer 20.

The material of the textile reinforcement layer 20 may be a non-thermoplastic material, as already discussed above, so that only the inner PUR film 10 and the outer PUR film 30 are melted together. The material of the textile reinforcement layer 20 may alternatively comprise a thermoplastic material (e.g. polyamide/nylon), so that this material also melts/merges with the PUR films. PUR films 10, 30 may also be printed.

Depending on the thickness of the textile reinforcement layer 20, which may e.g. be determined by the weave pattern or the yarns used, its structure may be felt through the PUR films and may also be visible, if a transparent PUR film is used. In this way, different surface structures having different properties, e.g. friction coefficients, may be manufactured, in particular with, e.g., different regions of the textile reinforcement layer 20 comprising textile materials with different weave patterns and/or different yarns, etc. as already discussed above. Furthermore, visual effects may be achieved by the use of different materials for the textile reinforcement layer 20 and different colors for the PUR films 10, 30.

In further embodiments of the material 1 for a shoe upper, the inner PUR film 10 comprises four film layers, or sublayers, 11-14 and the outer PUR film 30 comprises four film layers 31-34. Each of these layers may, for example, have a thickness of about 0.02 mm, so that the inner PUR film 10 and the outer PUR film 30 each have a thickness of approximately 0.08 mm. In some embodiments, each of these layers has a thickness of approximately 0.04 mm so that the inner PUR film 10 and the outer PUR film 30 each have a thickness of approximately 0.16 mm in total. In other embodiments, these sizes may vary. In particular, the individual film layers 11-14 and 31-34 may have different thicknesses.

The use of film layers, i.e. sublayers, may be desirable for a constant film thickness, among other things. Thus, the use of four film layers with a thickness of 0.2 mm each results in a constant layer thickness of 0.8 mm.

In further embodiments, the film layers may have a thickness of 0.10-0.16 mm.

Film layer 14 of the inner PUR film 10 and the film layer 31 of the outer PUR film 30, both of which face the textile reinforcement layer 20, may each have a lower melting point than the outer layers 11, 12, 13 and 32, 33, 34. During pressing of material 1, the inner PUR film 10 and the outer PUR film 30 may therefore be melted together under heat without a separate bonding layer being required and without the outer PUR film layers melting and their appearance on the surface being altered. The inner film layers melt more rapidly, thus facilitating melting without changing the outer film layers. Film layer 14 and 31, for example, may have a melting point of about 100-150° C., and may further have a melting point of about 130° C. The outer film layers 11, 12, 13 and 32, 33, 34 may have a melting point of 150-200° C., and may further have a melting point of about 160° C.

In further embodiments, further film layers 13 and 32, which are adjacent to the above-mentioned film layers 14 and 31, respectively, also have a lower melting point than the other film layers 11, 12 and 33, 34.

In further embodiments, the number of sublayers and their thicknesses may vary. In particular, also the inner PUR film 10 and the outer PUR film 30 may have different numbers of sublayers and have different properties. The inner PUR film 10 and the outer PUR film 30 may therefore be adjusted to their functions as inner and outer surfaces of a shoe upper, respectively. For example, the outer PUR film 30 (or only the outermost film layer) might be designed for high abrasion, which may be important for a soccer shoe.

In certain embodiments, the inner PUR film 10 and the outer PUR film 30 each comprise only 2 sublayers: one high density layer which bonds to the textile reinforcement layer 20 and one coat layer which sits on the outside and possesses abrasion resistant properties.

In theory, the polyurethane sublayers of the inner PUR film 10 and the outer PUR film 30 may have different properties. They may differ in terms of thickness (as described above), material properties (such as melting point), or color, for example. Two, several or all sublayers may differ in terms of their properties.

As described above, different surface structures may be generated by the use of different regions of the textile reinforcement layer 20 comprising different textile materials with different yarns and/or weave patterns, since the surface of the outer PUR film 30 adapts to the surface of the textile reinforcement layer 20 arranged below and therefore leads to a textured surface. Thus, it is possible to create zones with different surface textures, which fulfill different functions, in a shoe upper. For example, a soccer shoe may comprise zones which have different frictions or adhesions when in contact with a ball. Thus, for example, zones of a soccer shoe which are often used for dribbling, may be provided with great friction on their surface by a corresponding surface structure being selected, so as to ensure good control of the ball in that way.

In some embodiments, a flat textile reinforcement layer 20 is used, because no 3D structure is needed, i.e. the surface is to be as smooth as possible and the film is not intended to melt into the textile reinforcing layer. In theory, both smooth and structured surfaces are possible.

Although the resulting material 1 for a shoe upper has a very low weight, this material passes quality tests with respect to abrasion resistance, flexibility, delamination, UV stability, resistance to hydrolysis, mechanical stability (such as tensile strength, tear strength, seam resistance) and other criteria.

Figure 6:
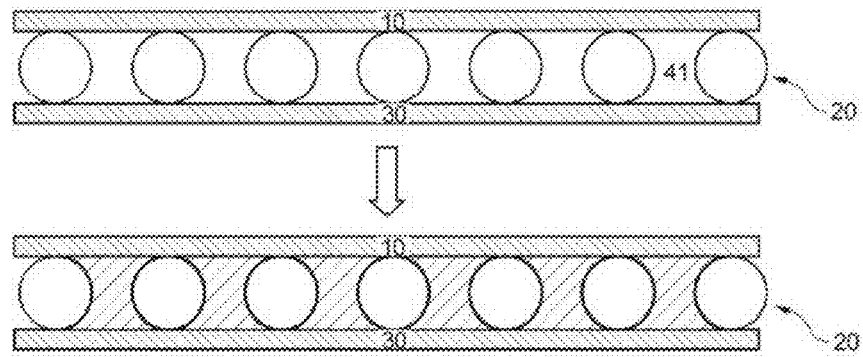
FIG. 6 is an illustration of the manufacture of a material, according to certain embodiments of the present invention.

FIG. 6 illustrates the manufacturing process which was described above for a material 1 comprising a textile reinforcement layer 20 comprising apertures 41, e.g. apertures 42 of the textile reinforcement layer 20 shown in FIG. 3, by showing a schematic cross-sectional view of the material before and after manufacture. The material before manufacture is depicted in the upper area of FIG. 6 and after manufacture is depicted in the lower area. The textile reinforcement layer 20 is indicated by circles, which may, for example, represent a cross-section through yarns of the textile reinforcement layer 20. These may include, e.g., the yarns 231, 232 and 233 (or yarns from one of the other two sets of essentially parallel yarns) of the textile reinforcement layer 20 shown in FIG. 3. Further indicated are apertures 41, e.g. the apertures 42 shown in FIG. 3, arranged in between the yarns. By applying heat and pressure—indicated by the arrow in the center of FIG. 6—the first foil layer 10, e.g. the inner PUR film 10, and the second foil layer 30, e.g. the outer PUR film 30, may melt together by liquid material filling the apertures 41. The corresponding illustrations in FIG. 6 are purely schematic and do not represent proportions.

A foil layer 10, 30, in particular a PUR film 10, 30, with several sublayers, as illustrated in FIGS. 2 and 5, may be manufactured on a substrate. The sublayers are subsequently applied onto the substrate in a liquid state. All sublayers are than cured in an oven, which e.g. leads to a PUR film as described above.

In certain embodiments, the film layers, i.e. the sublayers, may also be directly attached to the textile reinforcement layer 20.

Figure 7A:
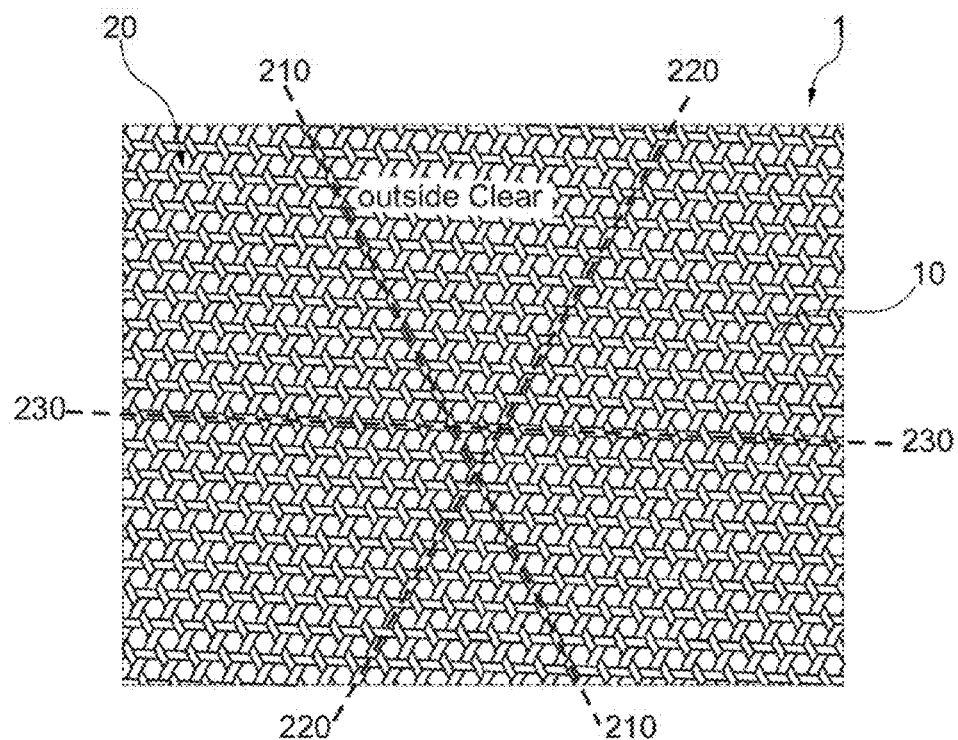
FIGS. 7a-b are top views of a material for a shoe upper comprising a first foil layer, a textile reinforcement layer, and a second foil layer, according to certain embodiments of the present invention.
Figure 7B:
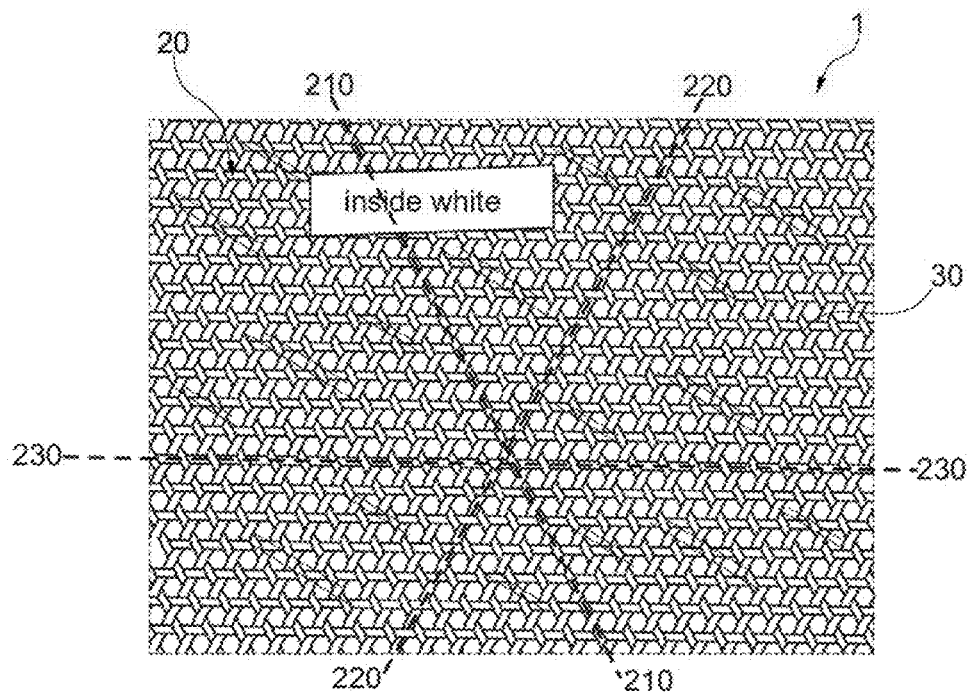

FIGS. 7a-b show additional embodiments of a material 1 for a shoe upper. The embodiments shown in FIGS. 7a-b comprise a first foil layer 10, a textile reinforcement layer 20 and a second foil layer 30.

The textile reinforcement layer 20 is the textile reinforcement layer 20 discussed in relation to FIG. 3 above.

The first foil layer 10, which in this case is intended to be arranged on the outside of a shoe upper for which the material 1 is used, comprises thermoset polyurethane. In some embodiments, first foil layer 10 comprises transparent material, such that the textile reinforcement layer 20 is visible from the outside. The thickness of the first foil layer may lie in a range between 0.15-0.25 mm, and may further lie in a range between 0.18-0.2 mm.

The second foil layer 30, which in this case is intended to be arranged on the inside of a shoe upper for which the material 1 is used, also comprises thermoset polyurethane. In some embodiments, the second foil layer 30 comprises an at least partially opaque material, which may be a white material. The thickness of the second foil layer may also lie in a range between 0.15-0.25 mm, any may further lie in a range between 0.18-0.2 mm.

The embodiments of a material 1 shown in FIGS. 7*a-b* may have a weight in the range of 32-37 g (A4 format), and may further have a weight in the range of between 34-35 g (A4 format).

The material shown in FIGS. 7*a-b* may, e.g., be manufactured using at least one of the manufacturing methods described herein.

Further embodiments of the invention are provided by a shoe upper, in particular for soccer shoes, comprising embodiments of an inventive material 1 and/or 100, as well as a shoe comprising such an upper.

Figure 8:
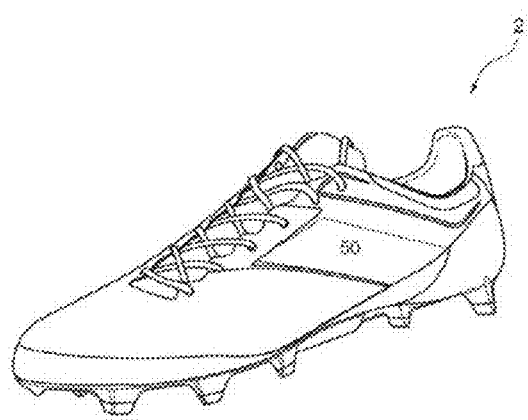
FIG. 8 is a perspective view of a soccer shoe with an upper comprising a material, according to certain embodiments of the present invention.

FIG. 8 shows a soccer shoe 2 in which the material 1 and/or 100 described above is used. An area (ribbon) 50 reinforced with aramid yarns (e.g. Kevlar®) for stabilizing lateral movements may be arranged in the lateral mid-foot area of the soccer shoe. Area 50 particularly supports the foot in movements in which the foot is bent inwards. For example, area 50 supports the foot when the foot lands on the ground if the leg is angled towards the inside of the foot. This prevents the danger of "twisting" the ankle.

Figure 9A:
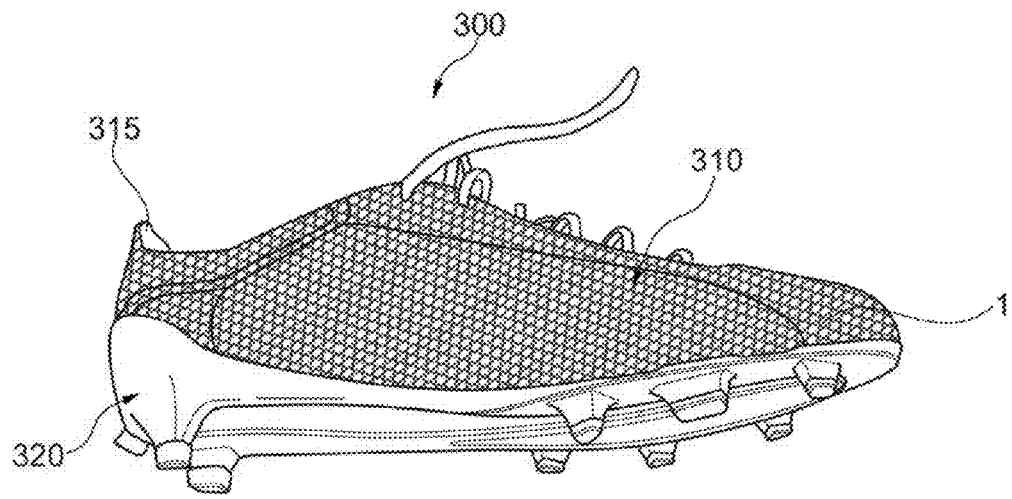
FIGS. 9a-b are perspective views of a soccer shoe with an upper comprising a material, according to certain embodiments of the present invention.
Figure 9B:
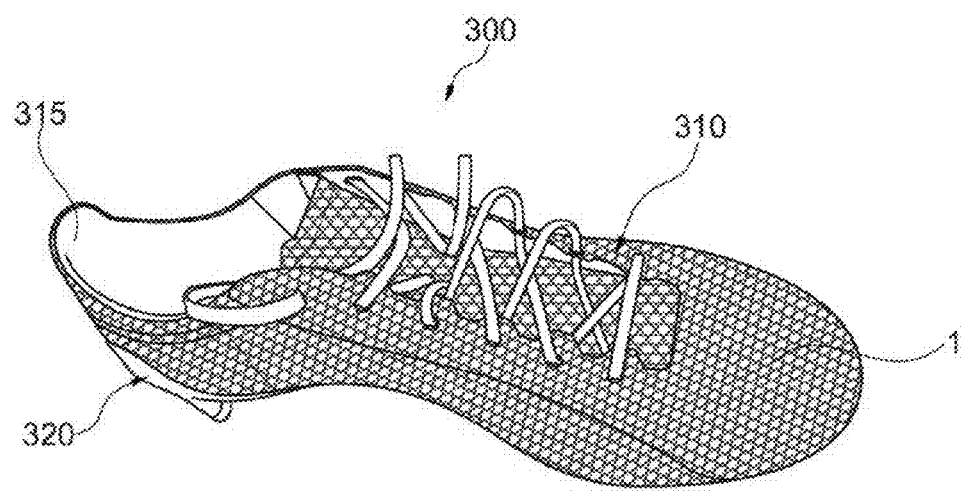

FIGS. 9*a-b* show other embodiments of a soccer shoe 300. The shoe 300 comprises a shoe upper 310 and an outsole 320.

The outsole 320 may be made from a durable plastic material to protect the wearer's foot against injuries, in particular from sharp or pointed objects when running and treading down, etc. In additional embodiments, the outsole 320 must still have enough flexibility in order not to unduly impede the wearer's movements.

The outsole 320 may furthermore comprise cleats to improve traction during running or other movements, as show in FIGS. 9*a-b*. In some embodiments, these cleats are provided integrally with the rest of the outsole 320, as also shown in FIGS. 9*a-b*.

The upper 310, on the other hand, comprises embodiments of the inventive material 1. More precisely, the embodiments of a soccer shoe 300 shown in FIGS. 9*a-b* comprises the embodiments of the inventive material 1 described with reference to FIGS. 7*a-b*. In theory, however, other embodiments of the material 1 are also possible. For example, instead of embodiments of the inventive material 1, embodiments of the inventive material 100 may be used with the upper 310. The upper may furthermore comprise an inlay 315, e.g. to prevent the upper from chafing on the wearer's foot. The inlay 315 may, for example, comprise a fleece material, a felt material, leather, or the like. The inlay may be arranged only in the heel region of the upper 310, or it may also extend towards the forefoot region of the upper 310, as illustrated in FIGS. 9*a-b*. Furthermore, the shoe 300 may also comprise further elements, like, e.g., a reinforced area as discussed with reference to the embodiment 2 shown in FIG. 8 above.

Materials 1 and 100 described above are thin, which is desirable in view of having a sports shoe with a low weight. However, because materials 1 and 100 have minimal damping, it may be desirable to increase damping of materials 1 and 100 for certain requirements. For example, a damping layer (not shown) may be introduced on the inside of material 1 or 100 or between the foil layers 10, 30. This damping layer could be a PU foam, for example, which is sprayed between the layers extensively or only in certain places. In order to enable this, the foil layers 10, 30 may be laminated only in certain places to provide unconnected cavities therebetween. The unconnected cavities may then be filled with compressed air, PU foam or other damping materials.

The textile reinforcement layer 20 may also comprise regions with different thicknesses, as already indicated above. In a first region comprising the first textile material, in which damping is desired, and in which the foil layers 10, 30 may e.g. not to be connected to each other, the textile reinforcing layer 20 could be designed with a correspondingly greater thickness, e.g. by using yarns of a greater thickness or a particular weave pattern. In a second region comprising a second textile material, in which no damping is desired and in which the foil layers 10, 30 are connected to each other, the textile reinforcing layer may be designed in a correspondingly thin manner, as described above.

Figure 10:
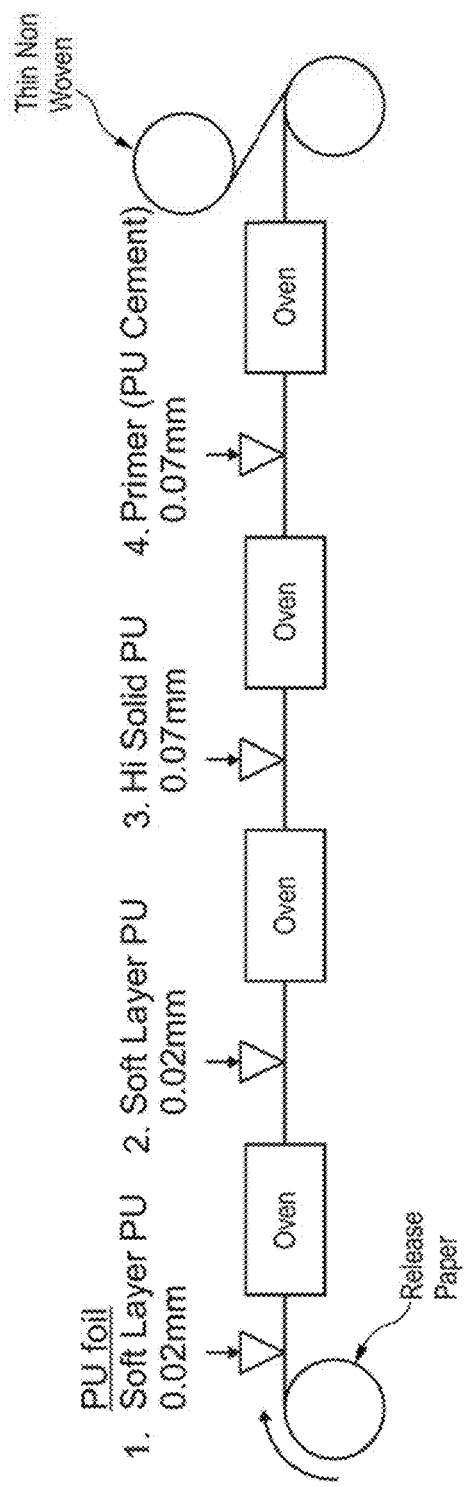
FIG. 10 is a diagram illustrating a production method of a polyurethane layer as used with certain embodiments of the present invention.

FIG. 10 shows a method for manufacturing a polyurethane layer having four polyurethane sublayers, which may be used in the aforementioned material 1 and/or 100 for a shoe upper. A stirred formulation is melted and released into a container. The container may constantly be mixed by a continually moving device. The formulation may be allowed to be dispersed from the bottom of the container evenly by allowing a small gap of specified thickness. A continuous moving release paper moves underneath dragging the mixture onto the release paper. The release paper may be embossed with a desired pattern and depth particular to the desired design and/or function. The thickness of the application of the first layer may also be monitored using a laser device scanning from one side to the other, or other thickness-measuring sensor, ensuring that thickness is applied consistently and evenly. For example, this first layer may have a thickness of 0.02 mm.

Following this step, the release paper may move through a heated oven at a constant speed until the specified amount of drying and evaporation has occurred.

The process may then be repeated applying a second layer of soft layer PU on top of the first layer. This second layer may also have a thickness of 0.02 mm for example.

A third layer may be applied to the second layer having a thickness of 0.07 mm for example. A second differing formulation may be included in this third application of PU. The above described process of applying the PU layers may be repeated with the third layer. This may be a thicker layer, set according to the accuracy that is required of the layers. Therefore, this layer may need more time in an oven and/or a higher temperature must be used. Upon changing of the layer, a color or formula change may also be applied to both soft and hard PU layers, according to features required.

The final application may apply a fourth layer whose function is to primarily assist with the bonding of the PU layers to the textile reinforcement layer and potentially the PU layer on the opposite side.

The PU layers and release paper may be kept tight by moving through various roller combinations. Following the final oven stage, a very thin and light non-woven material sheet may be placed on top of the PU surface to protect before rolling up for storage.

The final rolled-up PU film may be moved to a storage device where it is left to cure and stabilize, for example for 24 hours, before ready for use in shoe production.

The polyurethane layer being produced as described above may then be used to produce a material for a shoe upper according to the invention as follows: A polyurethane film or layer and the textile reinforcement layer with apertures are die cut. The textile reinforcement layer is arranged between a first polyurethane layer and a second polyurethane layer. The material may be assembled on a silicon pad and pressed under a heat press. The material may be flipped around and rotated by approximately 90°. Thus, if the orientation was "landscape" before, it now is "portrait" and vice versa. The material may then be heat pressed a second time. By the above-described process both polyurethane layers melt together through the apertures of the textile reinforcement layer. The first polyurethane layer may for example be the inner polyurethane layer 10 as mentioned in this description and the second polyurethane layer may be the outer polyurethane layer 30 as mentioned in this description. The situation may as well be reversed.

During pressing the machine temperature may approximately be 140° C. on both sides of the press. The assembly may be pressed for approximately 30 seconds. The pressure may be approximately 100 kg/cm$^2$.

Figure 11:
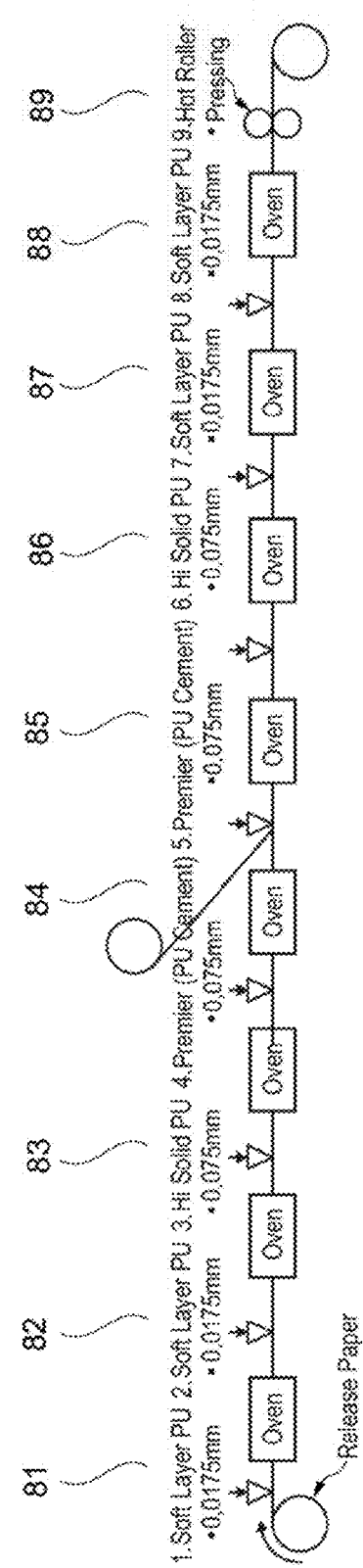
FIG. 11 is a diagram illustrating a production method of a material for a shoe upper, according to certain embodiments of the present invention.

FIG. 11 shows an alternative method for producing a material according to the invention which is based on a liquid PU.

Steps 81 to 84 use the same production techniques as described above with respect to FIG. 10 with the exception of variable oven times. The oven time is varied to ensure that the layer is not fully dry before applying a textile reinforcement layer. Thus, liquid polyurethane is poured directly onto a release paper. The liquid polyurethane is applied in four sublayers. The first and second of these sublayers may have a thickness of approximately 0.0175 mm, while the third and fourth sublayers may have a thickness of approximately 0.075 mm.

Between steps 84 and 85, a textile reinforcement layer (e.g. as described with relation to FIG. 3) is directly included in the process on top of the semi dry PU layer. A light pressing step may also be included at this stage. The textile reinforcing layer may have apertures as mentioned in this description.

In steps 85 to 88, the reverse order of sublayers is then applied using similar methods of inter-layer oven heating. At this stage, the material is almost fully dry. However, the sublayers on both sides next to the textile reinforcement layer may still be semi-liquid and, therefore, may bond through the apertures of the textile reinforcement layer even without heat-pressing. Heat-pressing, such as in step 89, may further enhance the bond.

At step 89, a final hot roller at high pressure ensures full bonding of layer to layer and layer to textile reinforcement layer. The inner sublayers melt together through the apertures in the textile reinforcement layer. At this stage, an embossment may be added through the roller on both sides if the release paper is removed or by release paper on one side. Because of the opportunity for molecular bonding here, there is potential for a removal or replacement of the inner (sub)layers which are also called the primer (sub)layers.

Additional embodiments of a production method is also possible, which initially follows the embodiments discussed above in relation with FIG. 10. Following the application of the fourth sublayer, however, and prior to curing in the oven, the textile reinforcement layer is applied on top of the still wet fourth sublayer. The material is then passed through an oven to cure the fourth layer and achieve a bonding between the PU and textile reinforcement layer. The material may then be pressed through hot or cold rollers to enhance the bonding. This material would then be rolled up for storage similar to above. On a second production line, this material would then be introduced in place of the release paper and the four sublayers would be applied to the textile reinforcement layer in reverse order. At the end of this process, a hot or cold roller process may be applied in order to improve the bonding between the PU and the textile reinforcement layer.

Additionally, or alternatively, the foil layers and the textile reinforcement layer may also be bonded in an autoclave process.

The three methods being described above include the potential to vary (sub)layer formula, color combination and thickness according to the features and specifications that are required on the shoe, requiring small changes in oven time or temperature. The number of sublayers is also changeable using the same production techniques. For example, a single sublayer, two sublayers, three sublayers or even more than four sublayers could be used. Alongside this, it is possible to vary the textile reinforcement layer.

Further embodiments for a method for manufacturing an inventive material for use with a shoe upper with a textile reinforcement layer comprising a braided first textile material (not shown) includes the step of applying at least one layer of polyurethane onto a heatable last. If more than one (sub)layer is applied, the last may be temporarily heated and the individual sublayers may be left to at least partially solidify before the next sublayer is applied. Once all (sub)layers are thus applied, and possibly also at least partially solidified, the first textile material of the textile reinforcement layer is braided around the outmost (sub)layer applied to the heatable last in a next step.

After braiding the first textile material of the textile reinforcement layer around the outmost (sub)layer previously applied to the heatable last, a further layer, or multiple sublayers, of polyurethane may be applied on top of the textile reinforcement layer, in the way described above in relation to the initially applied PU layer/sublayers. After that, the last might be heated in a further method step to fuse all components of the material for a shoe upper together. Compared to the use of a textile reinforcement material comprising a woven first textile material, the use of braiding may save costs and effort.

In the following, further examples are described to facilitate the understanding of the invention:
1. Material (1; 100) for a shoe upper (310), in particular for soccer shoes (2; 300), comprising:
    a. a first foil layer (10); and
    b. a textile reinforcement layer (20) at least partly laminated with the first foil layer (10);
    c. wherein the textile reinforcement layer (20) comprises a first textile material with at least three axes (210; 220, 230), each axis (210; 220, 230) defining an orientation of a set (215; 225; 235) of essentially parallel yarn-portions (211, 212, 213; 221, 222, 223; 231, 232, 233) in the first textile material.
2. Material (1; 100) for a shoe upper (310) according to example 1, wherein the yarn-portions (211, 212, 213; 221, 222, 223; 231, 232, 233) essentially comprise entire yarns (211, 212, 213; 221, 222, 223; 231, 232, 233).
3. Material (1; 100) for a shoe upper (310) according to example 1 or 2, wherein the first textile material of the textile reinforcement layer (20) is a woven material.
4. Material (1; 100) according to any of the preceding examples, wherein the first textile material comprises multiple sublayers of woven textile material that are interconnected to each other.
5. Material (1; 100) according to any of the preceding examples, wherein the yarns (211, 212, 213; 221, 222, 223; 231, 232, 233) in the first textile material comprise one or more of the following materials: thermoset polyester, thermoset polyurethane, thermoplastic polyester, thermoplastic polyurethane, carbon, polyamide, nylon, basalt, various ultra-high molecular weight polyethylene such as those sold under the trade name of Dacron®, Dyneema®, and Spectra, various aramids such as those sold under the trade name of Technora®, Kevlar®, and Twaron®, polymers with nanotubes or graphene, various liquid crystal polymers such as those sold under the trade names of Vectran®, polyparaphenylene-benzobisethiazole ("PBO") such as that sold under the trade name of Zylon®, polyvinylidene chloride such as that sold under the trade name of Saran, polyethylene naphtalathe, and electrical conductive material.

6. Material (1; 100) according to one of the preceding examples 2-5, wherein the yarns (211, 212, 213) in at least one set (215) of essentially parallel yarns in the first textile material differ in one or more characteristic from the yarns (221, 222, 223; 231, 232, 233) in one or more of the remaining sets (225; 235) of essentially parallel yarns in the first textile material.

7. Material (1; 100) according to example 6, wherein the one or more characteristics are one or more of: color, thickness, base material, tear strength.

8. Material (1; 100) according to one of the preceding examples, wherein the textile reinforcement layer comprises a first region and a second region, the first region comprising the first textile material and the second region comprising a second textile material.

9. Material (1; 100) according to example 8, wherein the second textile material is a material with at least three axes (210; 220; 230), each axis (210; 220; 230) defining an orientation of a set (215; 225; 235) of essentially parallel yarn-portions (211, 212, 213; 221, 222, 223; 231, 232, 233) in the second textile material.

10. Material (1; 100) according to example 8 or 9, wherein the yarns in the first textile material comprise a thermoplastic material and wherein the yarns in the second textile material comprise a non-thermoplastic material.

11. Method (1; 100) according to any of examples 8-10, wherein the first textile material and the second textile material comprise different weave patterns.

12. Material (1; 100) according to any of examples 8-11, wherein the first textile material and the second textile material are provided as one integral piece.

13. Material (1; 100) according to any of examples 8-11, wherein the first textile material and the second textile material are provided as separate pieces that overlap and/or interlock within the textile reinforcement layer.

14. Material (1) according to any of the preceding examples, further comprising a second foil layer (30) at least partially laminated with the textile reinforcement layer (20) and/or the first foil layer (10) and arranged at a side of the textile reinforcement layer (20) opposite to the first foil layer (10).

15. Material (1; 100) according to any of the preceding examples, wherein the first foil layer (10) and/or the second foil layer (30) comprise multiple sublayers (11, 12, 13, 14; 31, 32, 33, 34).

16. Material (1; 100) according to any of the preceding examples, wherein the first foil layer (10) and/or the second foil layer (30), and/or one or more of the multiple sublayers (11, 12, 13, 14; 31, 32, 33, 34) of the first and/or second foil layer (10; 30), comprise one or more of the following materials: thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polylactide, polyamide.

17. Material (1) according to any of examples 14-16, wherein the textile reinforcement layer (20) comprises apertures (41; 42) and wherein the first foil layer (10) and the second foil layer (30) are connected to each other through the apertures (41; 42) of the textile reinforcement layer (20).

18. Material (1; 100) according to any of the preceding examples, having a three-dimensional shape.

19. Material (1; 100) according to example 18, wherein the three-dimensional shape is obtained by at least partly heating the yarns (211, 212, 213; 221, 222, 223; 231, 232, 233) of the first textile material and/or the second textile material.

20. Upper (310) for a shoe (2; 300), in particular for a soccer shoe (2; 300), comprising a material (1; 100) according to any of the examples 1-19.

21. Shoe (2; 300), in particular soccer shoe (2; 300), comprising an upper (310) according to example 20.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. Material for a shoe upper comprising:
   (a) a first foil layer; and
   (b) a textile reinforcement layer at least partly laminated with the first foil layer, wherein the first foil layer comprises an inner sublayer and an outer sublayer, wherein the inner sublayer is adjacent to the textile reinforcement layer and comprises polyurethane, and wherein the inner sublayer comprises a lower melting point than the outer sublayer,
   wherein the textile reinforcement layer comprises a first region comprising a first textile material and a second region comprising a second textile material different from the first textile material, and wherein a surface structure of the material for the shoe upper in the first region is different from a surface structure of the material for the shoe upper in the second region,
   wherein the first textile material comprises at least three axes,
   wherein a first axis defines an orientation of a first set of yarns in the first textile material that extend continuously and essentially parallel to the first axis when the first textile material is arranged in a flat configuration,
   wherein a second axis defines an orientation of a second set of yarns in the first textile material that extend continuously and essentially parallel to the second axis when the first textile material is arranged in the flat configuration,
   wherein a third axis defines an orientation of a third set of yarns in the first textile material that extend continuously and essentially parallel to the third axis when the first textile material is arranged in the flat configuration, and wherein a tensile strength of the first textile material in a direction parallel to the first axis is different from a tensile strength of the first textile material in a direction parallel to the second axis.

2. The material for a shoe upper of claim 1, wherein the first textile material of the textile reinforcement layer is a woven material.

3. The material for a shoe upper of claim 1, wherein the first textile material comprises multiple sublayers of woven textile material that are interconnected to each other.

4. The material for a shoe upper of claim 1, wherein the yarns in the first textile material comprise at least one of a thermoset polyester, thermoset polyurethane, thermoplastic polyester, thermoplastic polyurethane, carbon, aramid, polyamide, nylon, basalt, ultra-high molecular weight polyethylene, polymers with nanotubes or graphene, liquid crystal polymers, polyethylene naphtalathe, polyvinylidene chloride, polyparaphenylene-benzobisethiazole or electrical conductive material.

5. The material for a shoe upper of claim 1, wherein a yarn thickness of the first set of yarns is different from a yarn thickness of the second set of yarns.

6. The material for a shoe upper of claim 1, wherein the material is pre-shaped into a desired three-dimensional shape.

7. The material for a shoe upper of claim 6, wherein the textile reinforcement layer is pre-shaped prior to incorporation into a shoe upper.

8. A shoe upper comprising the material of claim 1.

9. A shoe comprising the shoe upper of claim 8.

10. The material for a shoe upper of claim 1, wherein the first region comprises a first textile material, and wherein the second region comprises a second textile material, the second textile material different from the first textile material.

11. Material for a shoe upper comprising:
(a) a first foil layer;
(b) a textile reinforcement layer at least partly laminated with the first foil layer; and
(c) a second foil layer at least partially laminated with the textile reinforcement layer, the second foil layer arranged at a side of the textile reinforcement layer opposite the first foil layer,
wherein at least one of the first foil layer or the second foil layer comprise an inner sublayer and an outer sublayer, wherein the inner sublayer comprises polyurethane, and wherein the inner sublayer comprises a lower melting point than the outer sublayer,
wherein the textile reinforcement layer comprises a first region and a second region, the first region and the second region each comprising at least three axes, each axis defining an orientation of a set of essentially parallel yarn-portions in the textile reinforcement layer,
wherein for each set of yarn-portions, each yarn-portion comprises a yarn extending continuously and essentially parallel to the respective axis,
wherein the yarns of the set of yarn-portions in the orientation essentially parallel to a first axis of the at least three axes of the first region comprise a first material and the yarns of the set of yarn-portions in the orientation essentially parallel to a second axis of the at least three axes of the second region comprise a second material different from the first material such that the yarns essentially parallel to the first axis differ in at least one characteristic from the yarns essentially parallel to the second axis,
wherein a thickness of the textile reinforcement layer in the first region is different from a thickness of the textile reinforcement layer in the second region, and
wherein the textile reinforcement layer comprises apertures and wherein the first foil layer and the second foil layer are bonded to each other through the apertures of the textile reinforcement layer without adhesives.

12. The material for a shoe upper of claim 11, wherein both the first foil layer and the second foil layer comprise a plurality of multiple sublayers.

13. The material for a shoe upper of claim 12, wherein at least one of the plurality of sublayers of the first foil layer and at least one of the plurality of sublayers of the second foil layer comprise at least one of a thermoset polyurethane, thermoplastic polyurethane, polyester, polyisocyanate, aliphatic polyisocyanate, ethylene propylene diene monomer, silicone, polyvinyl chloride, thermoplastic elastomers, polyethylene, polylactide, or polyamide.

* * * * *